(12) United States Patent
Hashimoto

(10) Patent No.: US 6,538,964 B1
(45) Date of Patent: Mar. 25, 2003

(54) OPTICAL RECORDING METHOD AND APPARATUS FOR RECORDING A LINK PART ACCORDING TO AN EXTERNAL LINK METHOD

(75) Inventor: Hirokuni Hashimoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/405,090

(22) Filed: Sep. 27, 1999

(30) Foreign Application Priority Data

Sep. 30, 1998 (JP) .......................................... 10-276843

(51) Int. Cl.[7] ................................................ G11B 7/00
(52) U.S. Cl. ................................ 369/47.22; 369/47.27; 369/275.3
(58) Field of Search ........................... 369/59.2, 53.35, 369/275.3, 59.26, 47.28, 47.22, 47.27

(56) References Cited

U.S. PATENT DOCUMENTS

| | | | | |
|---|---|---|---|---|
| 5,953,299 A | * | 9/1999 | Miyamoto et al. ............ | 369/48 |
| 6,115,340 A | * | 9/2000 | Van Den Enden et al. ... | 369/59 |
| 6,172,947 B1 | * | 1/2001 | Senshu ........................ | 369/32 |
| 6,256,276 B1 | * | 7/2001 | Kobayashi et al. ....... | 369/47.31 |

FOREIGN PATENT DOCUMENTS

| | | |
|---|---|---|
| EP | 0 613 136 A2 | 8/1994 |
| EP | 0 800 172 A2 | 8/1997 |
| EP | 0 813 198 A2 | 12/1997 |
| EP | 0 837 471 A2 | 4/1998 |
| JP | 07235133 A | 9/1995 |
| JP | 08147702 A | 6/1996 |
| JP | 08273334 A | 10/1996 |
| JP | 09016971 A | 1/1997 |
| JP | 09115249 A | 5/1997 |
| JP | 09282796 A | 10/1997 |
| JP | 11296968 A | 10/1999 |

OTHER PUBLICATIONS

European Search Report dated Jan. 24, 2002.

* cited by examiner

Primary Examiner—Nabil Hindi
(74) Attorney, Agent, or Firm—Dickstein Shapiro Morin & Oshinsky LLP

(57) ABSTRACT

An optical recording apparatus records information on a rewritable recording medium having a pre-recorded address guide by an external link method without performing complex calculations. Data is recorded on the rewritable optical recording medium on an individual block basis along the pre-recorded address guide, the block including a predetermined number of sectors each of which has a consecutively numbered sector address. A link part having a predetermined fixed length is recorded between adjacent blocks. The link part lacks an address so that the sector address shifts from an address indicated by the pre-recorded address guide by the length of said link part.

11 Claims, 3 Drawing Sheets

OPTICAL RECORDING METHOD AND APPARATUS FOR RECORDING A LINK PART ACCORDING TO AN EXTERNAL LINK METHOD

BACKGROUND OF THE INVENTION

1. Field of the Invention

The present invention generally relates to an optical recording method and apparatus and, more particularly, to an optical recording method and apparatus using a rewritable optical recording medium which has previously recorded address information.

2. Description of the Related Art

Recently, a digital versatile disc-rewritable (DVD-RW) has attracted considerable attention as one of rewritable optical recording media.

A blank or brand new DVD-RW has previously recorded address guide information which is referred to as LPP address. The LPP address is provided by forming land pre-pits on a recording surface of the DVD-RW. A recording operation is performed by forming recording pits on the recording surface of the DVD-RW by referring to the LPP address. A group of recording pits form a sector which represents 2-kilobyte user data. An address (sector address) is assigned to each sector. Normally, the LPP address matches the sector address.

A minimum unit of data recorded on the DVD-RW is referred to as a block which normally includes 16 sectors. It is possible to record information (recording pits) over a plurality of blocks by a single continuous recording operation. However, when a recording operation for adding information to previously recorded information or an overwriting (rewriting) operation is performed on the DVD-RW, a link is generated between a previously recorded block and a newly recorded block. According to the nature of the link, user data cannot be recorded in the link part. There are various sizes (lengths) for the link such as a 0-kilobyte link, a 2-kilobyte link or a 32-kilobyte link.

According to the 0-kilobyte link, there is no unusable area in the link part. However, a drive margin in the link part is small, and a high accuracy is required for setting a start position of a recording operation. Additionally, a service life of the disc may be shortened since a start position of recording cannot be shifted and recording is performed many times in the same link part.

According to the 32-kilobyte link, a recordable area corresponding to 32 kilobytes (16 sectors) is assigned to the link part. When the 32-kilobyte link is used, reliability of the user data is high. However, since a large recordable area is assigned to the link part, an amount of information recordable on a single DVD-RW is extremely reduced.

According to the 2-kilobyte link, a recordable area corresponding to 2 kilobytes (one sector) is assigned to the link part. The 2-kilobyte link has an advantage in that a sufficient margin is provided by the link part while an amount of information recordable on a single DVD-RW is not greatly reduced as is in the case of the 32-kilobyte link.

As a method for achieving the 2-kilobyte link, there are an internal link method and an external link method. According to the internal link method, the link part is included in a block. Accordingly, if the block contains 32 kilobytes, user data included in a single block is 30 kilobytes. (16×2 kilobytes−2 kilobytes=30 kilobytes) On the other hand, according to the external link method, the link part is provided outside the block. Thus, the user data in a single block remains unchanged, that is, the user data included in a single block is 32 kilobytes.

Generally a computer treats data by a power of two. A filing system using a conventional optical information recording medium is also based on such a data structure. In the internal link method, user data becomes a multiple of 30 kilobytes which is not a power of two. Thus, there is a problem that the internal link method is inconvenient for a conventional filing system. On the other hand, since the user data treated by the external link method is 32 kilobytes, the external link method is easily applicable to a conventional filing system.

When data is recorded by the external link method using 2-kilobyte link (hereinafter, referred to as 2-kilobyte external link method), the link part corresponding to a single sector (2 kilobytes) is provided between adjacent blocks. Accordingly, a sector address which is recorded with the use data shifts from the previously recorded LPP address. As mentioned above, a unit of data recorded on the DVD-RW corresponds to a block which contains 16 sectors. Thus, an address of a first sector of a block must be a multiple of 16. More specifically, an address of a first sector of a block must be $XXX0_h$, and an address of the last sector in the same block must be $xxxF_h$ (xxx is an arbitrary hexadecimal number). In the 2-kilobyte external link method, the link part is provided outside the block. Thus, in order to give an address which is a multiple of 16 to a first sector of a block, an address cannot be assigned to the link part. That is, a link part which is not given an address exists between adjacent blocks. As a result, when data is recorded by the 2-kilobyte external link method, the sector address recorded with the user data shifts from the previously recorded LPP address. If such a shift occurs between the sector address and the PLL address at an arbitrary position on the DVD-RW medium, it is very difficult to calculate an address. Accordingly, there is a problem in that a recording or overwriting cannot be freely performed. Thus, although the 2-kilobyte link method is superior to other methods with respect to application to a conventional filing system, the 2-kilobyte external link method cannot be used in practice.

In a conventional recording method such as a disc-at-once method or an incremental write method, there is no link or the 0-kilobyte link, 32-kilobyte link or an internal link method using 2-kilobyte link is used. As a result, the sector address matches the LPP address. That is, a relationship between the sector address and the LPP address differs from the conventional recording method to the 2-kilobyte external link method. Thus, if an initial recording is performed by one of the methods, the same method must be used thereafter until whole recorded data is erased.

As a method for erasing recorded information on the DVD-RW, a physical erasing method or a logical erasing method may be used. In the physical erasing method, the recording pits are physically erased. In the logical erasing method, a specific pattern such as all-0 is recorded so as to substantially (logically) erase previously recorded pits. According to the nature of the DVD-RW, a service life of the DVD-RW can be longer when the logical erasing method is used than when the physical erasing method is used. As mentioned above, in the logical erasing method, an erasing pattern (erasing data) is recorded so as to erase recorded data, the sector address is recorded together with the erasing data. In order to facilitate address calculation, the sector address is recorded to match the LPP address so that the use of the DVD-RW after erasing becomes easy.

Generally, in an optical recording apparatus, when recording or overwriting is performed, a present address is recognized by reproducing both the sector address and the LPP address. Accordingly, there is a problem when data is recorded or overwritten on an erasing pattern by the 2-kilobyte external link method. This is because the erasing pattern is recorded according to the sector structure and the sector address matches the LPP address while the sector address of the sector recorded by the 2-kilobyte external link method shifts from the LPP address. Accordingly, when data is recorded or overwritten, the address of the previously recorded sector must be distinguishable from the LPP address so as to seek a target address from which the recording or overwriting operation is started.

SUMMARY OF THE INVENTION

It is a general object of the present invention to provide an improved and useful optical recording method and apparatus in which the above-mentioned problems are eliminated.

A more specific object of the present invention is to provide an optical recording method and apparatus which can record information on a rewritable recording medium having a pre-recorded address guide by the external link method without performing complex calculations.

Another object of the present invention is to provide a rewritable optical recording medium which can be recorded by the external link method without complex calculations.

In order to achieve the above-mentioned objects, there is provided according to one aspect of the present invention a method for recording information on a rewritable optical recording medium having a pre-recorded address guide, the method comprising the steps of:

recording data on the rewritable optical recording medium on an individual block basis along the pre-recorded address guide, the block including a predetermined number of sectors each of which has a consecutively numbered sector address; and recording a link part having a predetermined fixed length between adjacent blocks, the link part lacking an address so that the sector address shifts from an address indicated by the pre-recorded address guide by the length of said link part.

According to this invention, by providing the link part having a length corresponding to a single sector such as 2 kilobytes, a large margin between the adjacent blocks can be maintained at the link part while an efficiency of use of the recordable area of the recording medium is maintained at a relatively high level. Thus, recording can be freely performed on an individual block basis. Additionally, since the minimum recording unit which corresponds to a single block is fixed, a relationship between the address indicated by the pre-recorded address guide and the sector address becomes simple. That is, the sector address shifts from the address indicated by the pre-recorded address guide according to a simple rule, and, thereby, the calculation of address can be simple. Accordingly, the external link method in which the link part is provided outside the recording unit can be used in practice.

Additionally, the method according to the present invention may further comprise the step of:

erasing data recorded on the rewritable optical recording medium before rewriting new data, the erasure being performed by recording erasing data having a predetermined erasing pattern, the erasing data including the sector address so that the sector address in the erasing pattern matches the address indicated by said pre-recorded address guide.

Accordingly, the calculation of an address after the erasure of previously recorded data becomes simple since the address in the erasing data matches the address indicated by the pre-recorded address guide.

Additionally, the method according to the present invention may further comprise the steps of:

determining whether or not data recorded at a currently reading position on the rewritable optical recording medium is the erasing data;

recognizing the currently reading position from the sector address in the erasing data when the data recorded at the currently reading position is the erasing data; and recognizing the currently reading position by a predetermined calculation based on the sector address when the data recorded at the currently reading position is not the erasing data.

Accordingly, the currently reading position on the recording medium can be accurately recognized by a simple calculation regardless of whether or not the data recorded at the currently reading position is the erasing data. Thus, a target address can be accurately reached based on the currently reading position.

Additionally, there is provided according to another aspect of the present invention an optical recording apparatus using a rewritable optical recording medium having a pre-recorded address guide, the optical recording apparatus comprising:

a light beam source projecting a light beam onto the rewritable optical recording medium so as to record data on or reproduce data from said rewritable optical recording medium;

a reproducing unit reading data recorded on the rewritable optical recording medium, the data being read based on the light beam reflected by the rewritable optical recording medium;

a recording unit recording data on the rewritable optical recording medium on an individual block basis along the pre-recorded address guide, the block including a predetermined number of sectors each of which has a consecutively numbered sector address, the recording unit recording a link part having a predetermined fixed length between adjacent blocks, the link part lacking an address so that the sector address shifts from an address indicated by the pre-recorded address guide by the length of the link part;

determining means for determining whether or not data recorded at a currently reading position on the rewritable optical recording medium is erasing data having a predetermined erasing pattern;

first recognizing means for recognizing the currently reading position from the sector address included in the erasing data when the data recorded at the currently reading position is the erasing data; and second recognizing means for recognizing the currently reading position by a predetermined calculation based on the sector address when the data recorded at the currently reading position is not the erasing data; and seeking means for seeking a target address by recognizing the currently reading position by one of the first recognizing means and the second recognizing means.

Accordingly, the currently reading position on the recording medium can be accurately recognized by a simple calculation regardless of whether or not the data recorded at the currently reading position is the erasing data. Thus, a target address can be accurately reached based on the currently reading position.

Additionally, there is provided according to another aspect of the present invention a rewritable optical recording medium having a pre-recorded address guide, comprising:

data recorded on an individual block basis along the pre-recorded address guide, the block including a predetermined number of sectors each of which has a consecutively numbered sector address; and a link part having a predetermined fixed length and provided between adjacent blocks, the link part lacking an address so that the sector address shifts from an address indicated by the pre-recorded address guide by the length of said link part.

Other objects, features and advantages of the present of the resent invention will become more apparent form the following detailed description when read in conjunction with the accompanying drawings.

DETAILED DESCRIPTION OF THE PREFERRED EMBODIMENT

A description will now be given, with reference to FIG. 1, of an optical recording apparatus according to an embodiment of the present invention. The optical recording apparatus shown in FIG. 1 uses a DVD-RW 1 as a rewritable optical recording medium.

Figure 1:
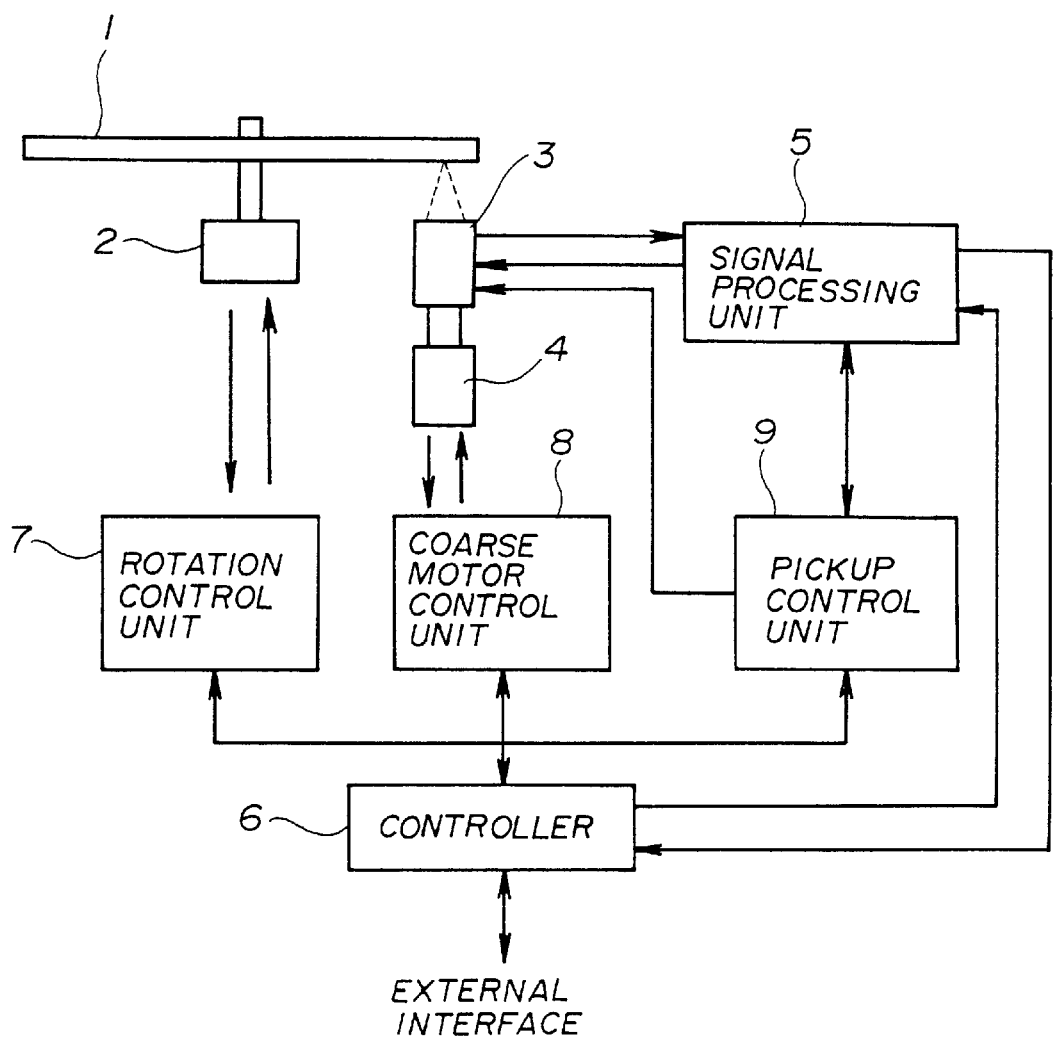
FIG. 1 is a block diagram of an optical recording apparatus according to an embodiment of the present invention.

The optical recording apparatus shown in FIG. 1 is provided with a motor 2 which rotates the DVD-RW 1 attached on a turntable. An optical pickup 3 projects a laser beam onto the DVD-RW 1 so as to record information on the DVD-RW 1 or read information recorded on the DVD-RW 1. The optical pickup 3 is movable by a coarse motor 4 in a radial direction of the DVD-RW 1. The optical pickup 3 is connected to a signal processing unit 5. The signal processing unit 5 controls the optical pickup 3 to project a laser beam onto the DVD-RW 1 and processes reproducing signals obtained from a laser beam reflected by the DVD-RW 1 and received by the optical pickup 3. The motor 2 for rotating the DVD-RW 1 is controlled by a rotation controlling unit 7. The coarse motor 4 for moving the optical pickup 3 is controlled by a coarse motor control unit 8. The pickup 3 and the signal processing unit 5 are controlled by a pickup control unit 9. The signal processing unit 6, the rotation control unit 7, the coarse motor control unit 8 and the pickup control unit 9 are controlled by a controller 6. The signal processing unit 5 is directly controlled by the controller 6 and also controlled by the pickup control unit 9.

In the above-mentioned structure, a laser beam is emitted at a reproducing power when a reproducing operation on the DVD-RW 1 is performed, and the laser beam reflected by the DVD-RW 1 is received by the signal processing unit 5 via the optical pickup 3 so as to reproduce information recorded on the DVD-RW 1. Accordingly, a reproducing unit is constituted by the signal processing unit 5 being controlled by the controller 6. Additionally, a laser beam is modulated by a recording power when data is recorded on the DVD-RW 1, and the thus-emitted laser beam is focused onto the DVD-RW 1 so as to record the data on the DVD-RW 1.

The controller 6 is constituted by a microcomputer including a central processing unit (CPU). The controller 6 has a discriminating function for discriminating a type of information, a first recognizing function for recognizing a currently reading position, a second recognizing function for recognizing a currently reading position and a seeking function for seeking a target address. These functions are provided for recording data on the DVD-RW 1.

Figure 2:
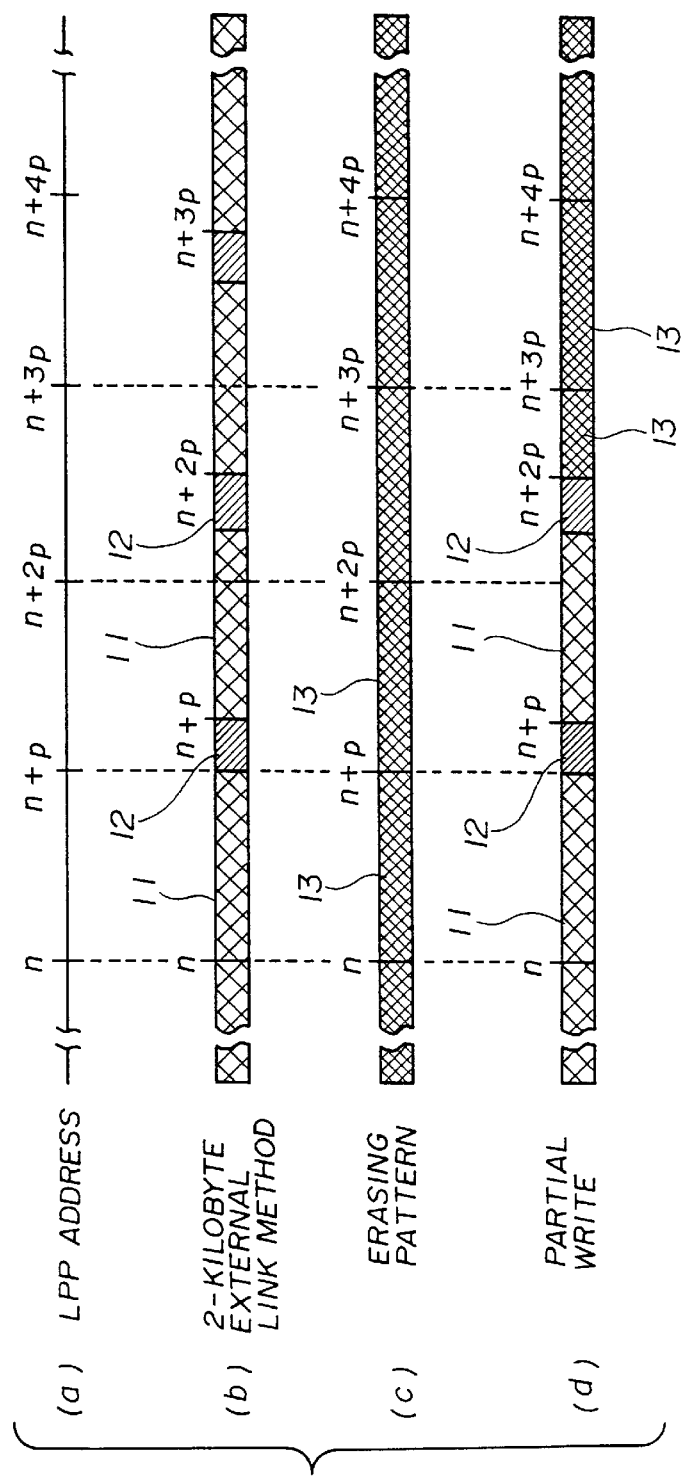
FIG. 2 is an illustration for explaining a relationship between an LPP address and a sector address according to a 2-kilobyte external link method.

A description will now be given, with reference to FIG. 2, of a relationship between the LPP address and the sector address recorded on the DVD-RW 1. FIG. 2 is an illustration of the LPP address previously recorded on the DVD-RW 1, the sector address which is recorded in accordance with the 2-kilobyte external link method and sector address included in an erasing pattern.

FIG. 2-(a) shows the LPP address previously recorded on the DVD-RW 1. In FIG. 2-(a), each of addresses "n", "n+p", "n+2p", "n+3p" and "n+4p" corresponds to the LPP address. In this embodiment, "p" corresponds to one block which consists of 32 kilobytes. That is, the LPP address is recorded every 32 kilobytes. In this embodiment, in order to record user data on the DVD-RW 1 having the above-mentioned LPP address, the 2-kilobyte external link method is used. FIG. 2-(b) shows the sector address which is recorded together with the user data on the DVD-RW 1. As shown in FIG. 2-(b), according to the 2-kilobyte external link method, the link part is provided for each recording unit (32 kilobytes) which is a block comprising 16 sectors (2 kilobytes). That is, the link part containing 2 kilobytes is provided immediately after each block. Specifically, the link part 12 is provided between the adjacent blocks 11. Accordingly, the LPP address increases for each 16 sectors while the sector address increases for each 17 sectors.

According to the 2-kilobyte external link method, since the 2-kilobyte link is added to each block having a fixed amount of information, a relatively large recording margin can be maintained while a high efficiency of use of the recordable area of the DVD-RW 1 is maintained. Additionally, recording can be performed on an individual block basis. Especially, since the number of sectors constituting a single block is fixed, a positional relationship between the LPP address and the corresponding sector address can be simple, which results in an easy address calculation. By using the 2-kilobyte external link method, the user data area of each block 11 can be a multiple of 32 kilobytes which corresponds to a power of two. This facilitates an application of a computer system such as a filing system.

A description will now be given of an erase of data previously recorded on the DVD-RW 1. In the present embodiment, the data recorded on the DVD-RW 1 is logically erased by recording an erasing pattern 13 as shown in FIG. 2-(c). The erasing pattern 13 includes the sector address which matches the LPP address. Accordingly, as long as the position of the address is concerned, the DVD-RW 1 of which data is erased becomes the same as a blank or brand new DVD-RW as shown in FIG. 2-(a). This facilitates easy calculation of an address for proceeding recording. Thus, a recording can be done by either the conventional recording method or the 2-kilobyte external link method. When data recorded on the DVD-RW 1 is partially erased, a part of the data recorded by the 2-kilobyte external link method and a part of the erasing pattern 13 are mixed.

A description will now be given, with reference to FIG. 3, of an address recognizing operation performed when data is recorded by the 2-kilobyte external link method on the erased part as shown in FIG. 2-(d). In this case, the sector address in the erasing pattern 13 matches the LPP address while the sector address in the part recorded by the 2-kilobyte external link method shifts from the LPP address. Accordingly, when data is recorded or overwritten, a target address from which a recording operation is started must be sought by recognizing a present position or a currently reading position by distinguishing the recorded sector address from the LPP address.

Figure 3:
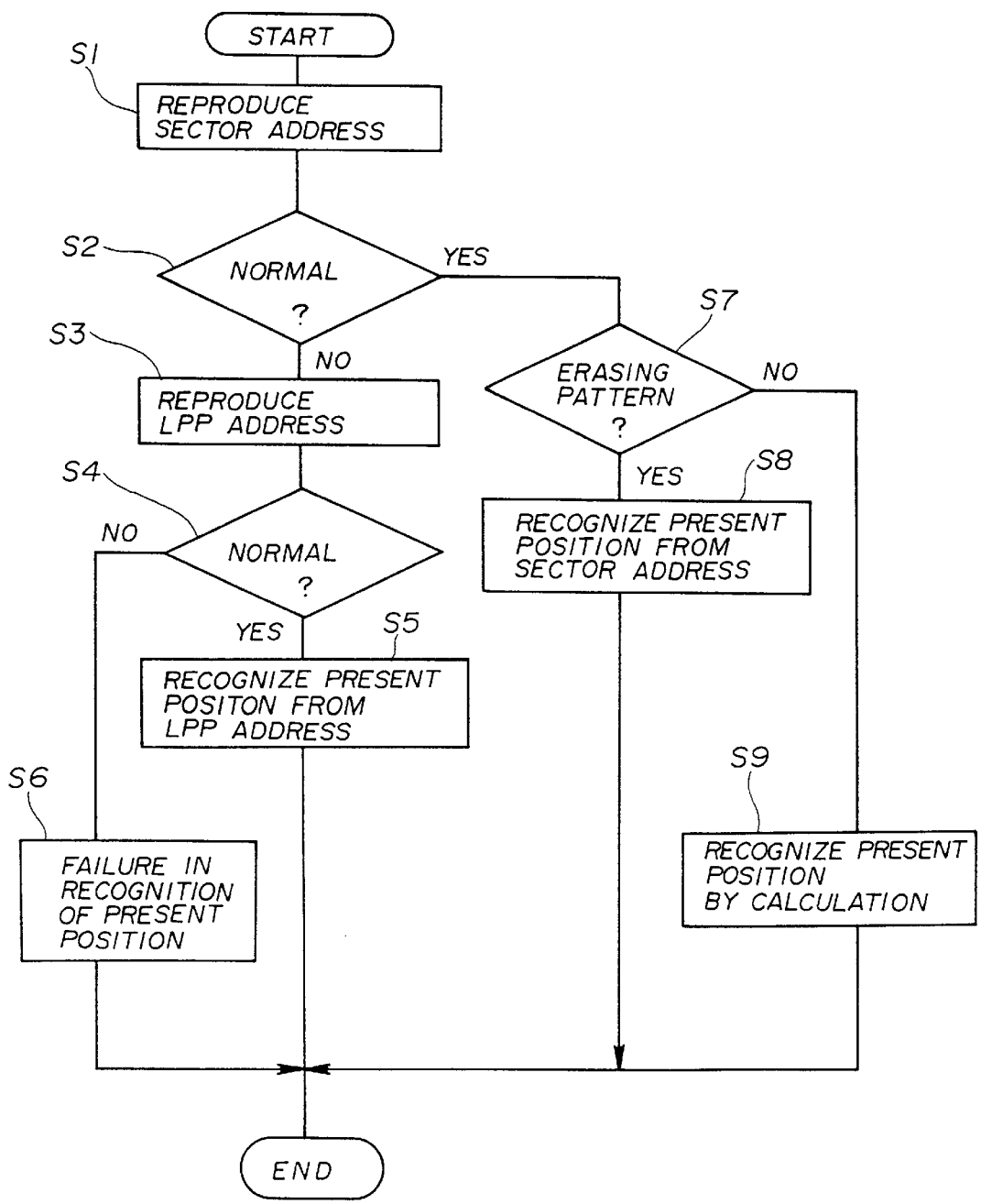
FIG. 3 is a flowchart of an operation for recognizing a present position.

When the address recognizing operation shown in FIG. 3 is started, data recorded on a sector on which a laser beam is currently projected is reproduced in step S1. It is then determined, in step S2, whether or not the data is normally reproduced. If the data is normally reproduced, the routine proceeds to step S7. Otherwise, the routine proceeds to step S3. In This case, the DVD-RW 1 may be a blank or brand new disc or quality of the recorded data may be deteriorated. It is also possible that an access error occurs due to dirt adhering to the DVD-RW1 or a correction error occurs in an EDC or ECC operation. If it is determined, in step S2, that the data is not normally reproduced, the routine proceeds to step S3 so as to reproduce the LPP address of the same position. Then it is determined, in step S4, whether or not the LPP address is normally reproduced. If the LPP address is normally reproduced, the routine proceeds to step S5. In step S5, the present position or currently reading position is recognized from the LPP address so that the recognized position is used in a seek operation. On the other hand, if it is determined, in step S4, that the LPP address is not normally reproduced, the routine proceeds to step S6. In step S6, it is recognized that the address recognition at the present position has failed due to the above-mentioned causes, and the routine is ended.

On the other hand, if it is determined, in step S2, that the sector address is normally reproduced, the routine proceeds to step S7. In step S7, it is determined whether or not the data recorded in the sector has an erasing pattern. This determination can be made by adding a recognition bit to a header of the sector which recognition bit represents whether the data recorded in the sector is the erasing data or user data. However, in the present embodiment, if the data in the sector is All-0 data, it is recognized that the data is the erasing data. Otherwise it is determined that the data in the sector is not the erasing data. It should be noted that the process of step S7 is achieved by an operation of a microcomputer provided in the controller 6.

If it is determined, in step S7, that the data in the sector is the erasing data, the routine proceeds to step S8. In step S8, the sector address recorded in the sector is recognized as the address of the present position since the sector address in the erasing data matches the LPP address, and the routine is ended. On the other hand, if it is determined, in step S7, that the data in the sector is not the erasing data, the routine proceeds to step S9. In step S9, the present position is recognized by a predetermined calculation since it can be determined that the sector address shifts from the LPP address by a length of the link part, and the routine is ended. It should be noted that the process of step S9 is achieved by an operation of the microcomputer provided in the controller 6.

As mentioned above, a seek operation to reach a target address is controlled by the recognition of the present position which recognition is achieved by performing the process of one of steps S5, S8 and S9, and a recording or overwriting operation is started from the target address. It should be noted that the seek operation is also controlled by the microcomputer of the controller 6.

A description will now be given of the calculation performed in the process of step S9 so as to recognize the present position. The relationship between the previously recorded LPP address and the sector address recorded by the 2-kilobyte external link method is represented by the following equation.

$$La = int[(Wa-Sa)/Ps] \times (Ps+Ls) + (Wa-Sa)\%Ps + Sa \quad (1)$$

Wa: sector address recorded by the 2-kilobyte external link method

La: LPP address

Sa: recording start address of the DVD-RW 1 (Normally Sa is equal to $30000_h$, and Wa is equal to La at this address. (Wa=La))

Ps: number of sectors in a single recording unit by an external link method (Normally and in the present embodiment, Ps is equal to 16. (Ps=16))

Ls: number of sectors of the link part by an external link method (In the 2-kilobyte external link method, Ls is equal to 1. (Ls=1))

Int[X]: integer part of X

%: residue

In the right side of the above mentioned equation (1), the first term is for calculating an LPP address corresponding to the sector address recorded by the external link method which sector address is included in an area preceding the present position. The LPP address is calculated by adding the length of the link parts to the LPP address. The second term is for adding a residue consisting of the erasing pattern. The third term is for adding the recording start address.

In the above-mentioned step 9, a calculation according to the equation (1) is performed so as to convert the sector address into the LPP address. Thereby, the present position or currently reading position on the DVD-RW 1 can be accurately recognized. Thus, according to the present embodiment, the present position can be accurately recognized even if data is recorded or overwritten on the erasing pattern 13, which results in an accurate seek operation for recording or overwriting.

It should be noted that although the DVD-RW is used as a medium having the LPP address which is a pre-recorded address guide, the medium is not limited to the DVD-RW. That is, the present invention is applicable to a rewritable medium having a pre-recorded address guide such as a wobble. Additionally, although the length of the link part is 2 kilobytes in the present embodiment, the length is not limited to 2 kilobytes and the length may be shortened so as to correspond to a length of a single sector, if it is possible.

The present invention is not limited to the specifically disclosed embodiments, and variations and modifications may be made without departing from the scope of the present invention when read in conjunction with the accompanying drawings.

The present application is based on Japanese priority application No. 10-276843 filed on Sep. 30, 1998, the entire contents of which are hereby incorporated by reference.

What is claimed is:

1. A method for recording information on a rewritable optical recording medium having a pre-recorded address guide, the method comprising the steps of:

recording data on the rewritable optical recording medium on an individual block basis along the pre-recorded address guide, the block including a predetermined number of sectors each of which has a consecutively numbered sector address;

recording a link part having a predetermined fixed length between adjacent blocks, said link part lacking an address so that the sector address shifts from an address indicated by the pre-recorded address guide by the length of said link part; and erasing data recorded on said rewritable optical recording medium before rewriting new data, the erasure being performed by recording erasing data having a predetermined erasing pattern, the erasing data including the sector address so that the sector address in the erasing pattern matches the address indicated by said pre-recorded address guide.

2. A method for recording information on a rewritable optical recording medium having a pre-recorded address guide, the method comprising the steps of:

recording data on the rewritable optical recording medium on an individual block basis along the pre-recorded address guide, the block including a predetermined number of sectors each of which has a consecutively numbered sector address;

recording a link part having a predetermined fixed length between adjacent blocks, said link part lacking an address so that the sector address shifts from an address indicated by the pre-recorded address guide by the length of said link part;

erasing data recorded on said rewritable optical recording medium before rewriting new data, the erasure being performed by recording erasing data having a predetermined erasing pattern matches the address indicated by said pre-recorded address guide;

determining whether or not data recorded at a currently reading position on said rewritable optical recording medium is the erasing data;

recognizing the currently reading position from the sector address in the erasing data when the data recorded at the currently reading position is the erasing data; and recognizing the currently reading position by a predetermined calculation based on the sector address when the data recorded at the currently reading position is not the erasing data.

3. A method for recording information on a rewritable optical recording medium having a pre-recorded address guide, the method comprising the steps of:

recording data on the rewritable optical recording medium on an individual block basis along the pre-recorded address guide, the block including a predetermined number of sectors each of which has a consecutively numbered sector address;

recording a link part having a predetermined fixed length between adjacent blocks, said link part lacking an address so that the sector address shifts from an address indicated by the pre-recorded address guide by the length of said link part;

erasing data recorded on said rewritable optical recording medium before rewriting new data, the erasure being performed by recording erasing data having a predetermined erasing pattern, the erasing data including the sector address so that the sector address in the erasing pattern matches the address indicated by said pre-recorded address guide;

determining whether or not data recorded at a currently reading position on said rewritable optical recording medium is the erasing data, wherein the step of determining includes determining the data at the currently reading position as the erasing data when data has the predetermined erasing pattern;

recognizing the currently reading position from the sector address in the erasing data when the data recorded at the currently reading position is the erasing data; and recognizing the currently reading position by a predetermined calculation based on the sector address when the data recorded at the currently reading position is not the erasing data.

4. A method for recording information on a rewritable optical recording medium having a pre-recorded address guide, the method comprising the steps of:

recording data on the rewritable optical recording medium on an individual block basis along the pre-recorded address guide, the block including a predetermined number of sectors each of which has a consecutively numbered sector address;

recording a link part having a predetermined fixed length between adjacent blocks, said link part lacking an address so that the sector address shifts from an address indicated by the pre-recorded address guide by the length of said link part;

erasing data rocorded on said rewritable optical recording medium before rewriting new data, the erasure being performed by recording erasing data having a predetermined erasing pattern, the erasing data including the sector address so that the sector address in the erasing pattern matches the address indicated by said pre-recorded address guide;

determining whether or not data recorded at a currently reading position on said rewritable optical recording medium is the erasing data, wherein the step of determining includes determining the data at the currently reading position as the erasing data by referring to information provided in a header of each block;

recognizing the currently reading position from the sector address in the erasing data when the data recorded at the currently reading position is the erasing data; and recognizing the currently reading position by a predetermined calculation based on the sectors address when the data recorded at the currently reading position is not the erasing data.

5. An optical recording apparatus using a rewritable optical recording medium having a prerecorded address guide, the optical recording apparatus comprising:

a light beam source projecting a light beam onto said rewritable optical recording medium so as to record data on or reproduce data from said rewritable optical recording medium;

a reproducing unit reading data recorded on said rewritable optical recording medium, the data being read based on the light beam reflected by said rewritable optical recording medium;

a recording unit recording data on said rewritable optical recording medium on an individual block basis along the pre-recorded address guide, the block including a predetermined number of sectors each of which has a consecutively numbered sector address, said recording unit recording a link part having a predetermined fixed length between adjacent blocks, said link part lacking an address so that the sector address of a leading sector of one of the blocks shifts from the sector address of a trailing sector of the preceding block whereby said shift is an address length corresponding to the length of said link part;

determining means for determining whether or not data recorded at a currently reading position on said rewritable optical recording medium is erasing data having a predetermined erasing pattern;

first recognizing means for recognizing the currently reading position from the sector address included in the erasing data when the data recorded at the currently reading position is the erasing data; and second recognizing means for recognizing the currently reading position by a predetermined calculation based on the sector address when the data recorded at the currently reading position is not the erasing data; and seeking means for seeking a target address by recognizing the currently reading position by one of said first recognizing means and said second recognizing means.

6. The optical recording apparatus as claimed in claim 5, wherein each of said sectors stores information corresponding to 2 kilobytes, and each block comprises $2^n$ sectors where n is an integer.

7. The optical recording apparatus as claimed in claim 6, wherein said predetermined fixed length of said link part is 2 kilobytes.

8. The optical recording apparatus as claimed in claim 5, further comprising:

an erasing unit erasing data recorded on said rewritable optical recording medium, the erasure being performed by recording the erasing data so that the sector address in the erasing pattern matches the address indicated by said pre-recorded address guide.

9. The optical recording apparatus as claimed in claim 5, wherein said determining means determines the data at the currently reading position as the erasing data when data has the predetermined erasing pattern.

10. The optical recording apparatus as claimed in claim 5, wherein said determining means determines the data at the currently reading position as the erasing data by referring to information provided in a header of each block.

11. A rewritable optical recording medium having a pre-recorded address guide, comprising:

data recorded on an individual block basis along the pre-recorded address guide, the block including a predetermined number of sectors each of which has a consecutively numbered sector address;

a link part having a predetermined fixed length and provided between adjacent blocks, said link part lacking an address so that the sector address shifts from an address indicated by the pre-recorded address guide by the length of said link part; and erasing data having a predetermined erasing pattern, the erasing data including the sector address which matches an address indicated by said pre-recorded address guide.

* * * * *